(12) United States Patent
Abe et al.

(10) Patent No.: US 11,560,501 B2
(45) Date of Patent: Jan. 24, 2023

(54) URETHANE ADHESIVE COMPOSITION

(71) Applicant: SIKA HAMATITE CO., LTD., Hiratsuka (JP)

(72) Inventors: Megumi Abe, Hiratsuka (JP); Yuichi Matsuki, Hiratsuka (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 450 days.

(21) Appl. No.: 16/646,309

(22) PCT Filed: Sep. 10, 2018

(86) PCT No.: PCT/JP2018/033461
§ 371 (c)(1),
(2) Date: Mar. 11, 2020

(87) PCT Pub. No.: WO2019/054333
PCT Pub. Date: Mar. 21, 2019

(65) Prior Publication Data
US 2020/0270493 A1    Aug. 27, 2020

(30) Foreign Application Priority Data

Sep. 12, 2017   (JP) .............................. JP2017-175005

(51) Int. Cl.
| | | |
|---|---|---|
| *C08K 5/5425* | (2006.01) | |
| *C09J 175/04* | (2006.01) | |
| *C08G 18/12* | (2006.01) | |
| *C08G 18/38* | (2006.01) | |
| *C08G 18/73* | (2006.01) | |
| *C09J 11/06* | (2006.01) | |

(52) U.S. Cl.
CPC ............ *C09J 175/04* (2013.01); *C08G 18/12* (2013.01); *C08G 18/3831* (2013.01); *C08G 18/73* (2013.01); *C08K 5/5425* (2013.01); *C09J 11/06* (2013.01); *C09J 2203/00* (2013.01)

(58) Field of Classification Search
CPC ......... C08G 18/06; C08G 71/04; C08L 75/04; C09J 175/04; C08K 5/5425; C08K 5/34924

See application file for complete search history.

(56) References Cited

U.S. PATENT DOCUMENTS

2011/0300377 A1* 12/2011 Koyama ............ C08G 18/8108
   522/42
2018/0223144 A1   8/2018 Abe et al.

FOREIGN PATENT DOCUMENTS

WO    2017/022666 A1    2/2017

\* cited by examiner

*Primary Examiner* — Kuo Liang Peng
(74) *Attorney, Agent, or Firm* — Carrier Shende & Associates, P.C.; Joseph P. Carrier; Anne G. Sabourin

(57) ABSTRACT

The present invention is to provide a urethane adhesive composition which exhibits excellent heat-resistant adhesion after storage to resin. The present invention relates to a urethane adhesive composition including: a urethane prepolymer having an isocyanate group; an isocyanurate compound having an isocyanurate ring; a terpene compound having active hydrogen; and a vinyl silane coupling agent represented by Formula (A) below: (where in Formula (A), $R^1$ and $R^3$ each independently represent a monovalent hydrocarbon group, $R^2$ represents a (n+1) valent hydrocarbon group, Vi represents —CH=CH$_2$, m1 is from 1 to 3, m2 is from 1 to 3, m3 is from 0 to 2, m1+m2+m3 is 4, and n is 1 or greater).

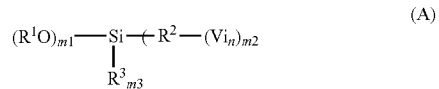

(A)

20 Claims, No Drawings

URETHANE ADHESIVE COMPOSITION

TECHNICAL FIELD

The present invention relates to a urethane adhesive composition.

BACKGROUND ART

In recent years, from the viewpoint of reducing the weight of automobiles, the material for a vehicle body has been replaced with a resin material (for example, a resin material containing at least an olefin resin) from a steel plate.

On the other hand, as an adhesive composition applicable to a base material containing an olefin resin, for example, a urethane adhesive composition containing a urethane prepolymer having an isocyanate group, an isocyanurate compound having an isocyanurate ring, and a terpene compound having an active hydrogen is proposed (Patent Document 1).

CITATION LIST

Patent Literature

Patent Document 1: WO 2017/022666

SUMMARY OF INVENTION

Technical Problem

Furthermore, from the viewpoint of safety of automobiles, the demand for adhesion to resin is increasing more and more.

Under these circumstances, the present inventors prepared and evaluated a urethane adhesive composition containing a silane coupling agent with reference to Patent Document 1, and found that the heat-resistant adhesion of the adhesive composition to a resin after prolonged standing (after storage) of the resin (hereinafter referred to as "heat-resistant adhesion to resin after storage") may not always satisfy the level needed in recent times.

Therefore, an object of the present invention is to provide a urethane adhesive composition having excellent heat-resistant adhesion after storage.

Solution to Problem

As a result of diligent research to solve the above problems, the present inventors have found that desired effects can be obtained by using a specific vinyl silane coupling agent in a urethane adhesive composition, and thus have completed the present invention.

The present invention is based on those findings described above and, specifically, solves the problem described above by the following features.

[1] A urethane adhesive composition including:

a urethane prepolymer having an isocyanate group;

an isocyanurate compound having an isocyanurate ring;

a terpene compound having active hydrogen; and a vinyl silane coupling agent represented by Formula (A) below:

[Chemical Formula 1]

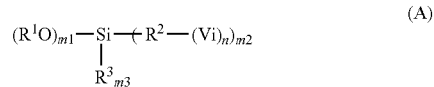

(where in Formula (A), $R^1$ and $R^3$ each independently represent a monovalent hydrocarbon group, $R^2$ represents a (n+1) valent hydrocarbon group, Vi represents —CH=CH$_2$, m1 is from 1 to 3, m2 is from 1 to 3, m3 is from 0 to 2, m1+m2+m3 is 4, and n is 1 or greater).

[2] The urethane adhesive composition according to [1], in which a content of the vinyl silane coupling agent is from 5 to 0.01 parts by mass with reference to 100 parts by mass of the urethane prepolymer.

[3] The urethane adhesive composition according to [1] or [2], in which in Formula (A), the (n+1) valent hydrocarbon group is a linear aliphatic hydrocarbon group.

[4] The urethane adhesive composition according to any one of [1] to [3], in which in Formula (A), a number of carbons of the (n+1) valent hydrocarbon group is from 3 to 12.

[5] The urethane adhesive composition according to any one of [1] to [4], in which in Formula (A), at least one Vi binds to a terminal of $R^2$.

[6] The urethane adhesive composition according to any one of [1] to [5], in which in Formula (A), m1 is 3, m2 is 1, m3 is 0, and n is 1.

[7] The urethane adhesive composition according to any one of [1] to [6], in which the isocyanurate compound is an isocyanurate compound of an aliphatic diisocyanate.

[8] The urethane adhesive composition according to any one of [1] to [7], in which the isocyanurate compound is an isocyanurate of pentamethylene diisocyanate.

[9] The urethane adhesive composition according to any one of [1] to [8], in which the active hydrogen is derived from a phenol compound.

[10] The urethane adhesive composition according to any one of [1] to [9], in which the terpene compound is a phenol-modified product of an oligomer of a monoterpene or a hydrogenated monoterpene, or a modified monoterpene.

[11] The urethane adhesive composition according to any one of [1] to [10], in which the urethane adhesive composition is two-part and has a main agent and a curing agent;

the main agent contains the urethane prepolymer, the isocyanurate compound, and the vinyl silane coupling agent;

the curing agent contains a compound having a plurality of active hydrogen-containing groups in one molecule; and the main agent and/or the curing agent contain(s) the terpene compound is contained.

[12] The urethane adhesive composition according to any one of [1] to [11], that is used to adhere a base material containing an olefin resin.

Advantageous Effects of Invention

The urethane adhesive composition according to an embodiment of the present invention has excellent heat-resistant adhesion after storage.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Furthermore, in the present specification, numerical ranges indicated using "(from) . . . to . . . " include the former number as the lower limit value and the later number as the upper limit value.

In the present specification, unless otherwise noted, for each component, a single substance corresponding to that component may be used alone, or a combination of two or more types of the corresponding substance may be used. When a component contains two or more types of substances, the content of the component means the total content of the two or more types of substances.

In the present invention, each component is not specifically limited about the production method unless otherwise specified. Examples include known methods.

In the present description, "heat-resistant adhesion after storage to resin" may be simply referred to as "predetermined adhesion".

Urethane Adhesive Composition

The urethane adhesive composition according to an embodiment of the present invention (adhesive composition according to an embodiment of the present invention) is a urethane adhesive composition including:
  a urethane prepolymer having an isocyanate group;
  an isocyanurate compound having an isocyanurate ring;
  a terpene compound having active hydrogen; and
  a vinyl silane coupling agent represented by Formula (A) below:

[Chemical Formula 2]

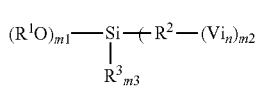
(A)

(where, in Formula (A), $R^1$ and $R^3$ each independently represent a monovalent hydrocarbon group, $R^2$ represents a (n+1) valent hydrocarbon group, Vi represents —CH=CH$_2$, m1 is from 1 to 3, m2 is from 1 to 3, m3 is from 0 to 2, m1+m2+m3 is 4, and n is 1 or greater.)

The adhesive composition of an embodiment of the present invention achieves desired effects probably owing to its configuration. Although the reason is not clear, it is assumed to be as follows.

Base materials containing non-polar resins such as olefin resins or resins with low polarity are generally difficult to adhere to an adhesive composition.

For this reason, base materials containing resins are generally subjected to surface treatment such as plasma treatment, and then an adhesive composition is applied thereto. However, in a case where the surface treatment is insufficient (for example, in a case where the surface treatment is performed under low wetting conditions), the adhesion between the base material and the adhesive composition is usually insufficient.

To a base material that includes at least a non-polar resin or a resin with a low polarity (it may be surface-treated, and the surface treatment may be insufficient), the adhesive composition according to an embodiment of the present invention can exhibit excellent adhesion (in particular, especially predetermined adhesion) at an excellent level.

The present inventors presume that the reason for this is that the hydrocarbon group having a vinyl group in the predetermined vinyl silane coupling agent has low polarity as a whole, and thus the adhesive composition according to an embodiment of the present invention containing the vinyl silane coupling agent easily wets the base material.

The components contained in the adhesive composition according to an embodiment of the present invention will be described in detail below.

Urethane Adhesive Composition

Urethane Prepolymer

The urethane prepolymer contained in the adhesive composition according to an embodiment of the present invention is a compound having an isocyanate group.

A preferred aspect of the urethane prepolymer is to have a plurality of isocyanate groups (preferably two isocyanate groups).

The urethane prepolymer preferably has an isocyanate group at a molecular terminal.

As the urethane prepolymer, known urethane prepolymers can be used. For example, a reaction product, obtained by reacting a polyisocyanate compound with a compound having at least two active hydrogen-containing groups per molecule (hereinafter, abbreviated as "active hydrogen compound") in a manner that the amount of the isocyanate group is in excess relative to the amount of the active hydrogen-containing groups can be used.

In the present invention, "active hydrogen-containing group" indicates "group containing an active hydrogen". Examples of the active hydrogen-containing group include a hydroxy group, an amino group, and an imino group.

Polyisocyanate Compound

The polyisocyanate compound used in the production of the urethane prepolymer is not particularly limited as long as the polyisocyanate compound has two or more isocyanate groups in one molecule.

Examples of the polyisocyanate compound include aromatic polyisocyanate compounds such as tolylene diisocyanate (TDI), diphenylmethane diisocyanate (MDI), 1,4-phenylene diisocyanate, polymethylene polyphenylene polyisocyanate, xylylene diisocyanate (XDI), tetramethyl xylylene diisocyanate (TMXDI), tolidine diisocyanate (TODI), 1,5-naphthalene diisocyanate (NDI), and triphenylmethane triisocyanate;

aliphatic (the aliphatic is a concept including linear, branched and alicyclic) polyisocyanates such as hexamethylene diisocyanate (HDI), trimethylhexamethylene diisocyanate (TMHDI), lysine diisocyanate, norbornane diisocyanate (NBDI), transcyclohexane-1,4-diisocyanate, isophorone diisocyanate (IPDI), bis(isocyanatemethyl)cyclohexane (H$_6$XDI), and dicyclohexylmethane diisocyanate (H$_{12}$MDI); and carbodiimide-modified polyisocyanates thereof.

The polyisocyanate compound may be used alone or a combination of two or more types of the polyisocyanate compounds may be used.

Among these, an aromatic polyisocyanate is preferable, and MDI is more preferable, from the perspective of excellent curability.

Active Hydrogen Compound

The compound having two or more active hydrogen-containing groups per molecule (active hydrogen compound) that is used during production of the urethane prepolymer is not particularly limited. Examples of the active hydrogen-containing group include a hydroxy (OH) group, an amino group, and an imino group.

Preferred examples of the active hydrogen compound include polyol compounds having two or more hydroxy (OH) groups in one molecule, and polyamine compounds having two or more amino groups and/or imino groups in one molecule. Among these, a polyol compound is preferable.

The polyol compound is not particularly limited as to its molecular weight and skeleton as long as it is a compound having two or more hydroxy groups. Specific examples of the polyol compound include polyether polyols; polyester polyols; acrylic polyols; polybutadiene polyols, hydrogenated polybutadiene polyols; low molecular weight polyhydric alcohols; and mixed polyols thereof. Among these, a polyether polyol is exemplified as an example of preferable aspects.

The polyether polyol is not particularly limited as long as the polyether polyol is a compound having a polyether as a main chain and having two or more hydroxy groups. "Polyether" is a group having two or more ether bonds, and their specific examples include a group having a total of two or more of structural units: —$R^a$—O—$R^b$—. Note that, in the structural unit, $R^a$ and $R^b$ each independently represent a hydrocarbon group. The hydrocarbon group is not limited. Examples include a straight-chain alkylene group having from 1 to 10 carbons.

Examples of the polyether polyol include a polyoxyethylene diol (polyethylene glycol), polyoxypropylene diol (polypropylene glycol; PPG), polyoxypropylene triol, ethylene oxide/propylene oxide copolymer, polytetramethylene ether glycol (PTMEG), polytetraethylene glycol, and sorbitol polyol.

The polyether polyol is preferably polypropylene glycol or polyoxypropylene triol from the perspective of excellent miscibility with a polyisocyanate compound.

The weight average molecular weight of the polyether polyol is preferably from 500 to 20000, from the perspective of the viscosity of the urethane prepolymer obtained by a reaction with an isocyanate compound has an appropriate fluidity at room temperature. In the present invention, the weight average molecular weight is a value obtained by GPC analysis (solvent: tetrahydrofuran (THF)) based on calibration with polystyrene.

The active hydrogen compound may be used alone, or a combination of two or more types of the active hydrogen compounds may be used.

The urethane prepolymer is preferably a urethane prepolymer formed by reacting a polyether polyol with an aromatic polyisocyanate compound, from the perspective of achieving even excellent adhesion and excellent curability.

The urethane prepolymer can be used alone or in combination of two or more kinds.

The method of producing the urethane prepolymer is not particularly limited. For example, the urethane prepolymer can be produced by using a polyisocyanate compound in a manner that from 1.5 to 2.5 mol of isocyanate group is reacted per 1 mol of the active hydrogen-containing group (e.g. hydroxy group) contained in the active hydrogen compound, and mixing these to perform a reaction.

The urethane prepolymer can be used alone or in combination of two or more kinds.

Isocyanurate Compound

The isocyanurate compound contained in the adhesive composition according to an embodiment of the present invention is a compound having an isocyanurate ring.

Preferable examples of the isocyanurate compound include at least one compound selected from the group consisting of an isocyanurate compound of aliphatic diisocyanate (C1), a (meth)acrylate compound having an isocyanurate ring (C2), a thiol compound having an isocyanurate ring (C3), and a glycidyl compound having an isocyanurate ring (C4) because a predetermined adhesion becomes more excellent.

Here, the "(meth)acrylate compound" refers to a compound having an acryloyloxy group or a methacryloyloxy group, and the below-described "(meth)acryloyloxy group" refers to an acryloyloxy group or a methacryloyloxy group.

Isocyanurate Compound (C1)

The isocyanurate compound (C1) is an isocyanurate compound of aliphatic diisocyanate.

Examples of the isocyanurate compound (C1) include isocyanurate compounds of aliphatic diisocyanates such as hexamethylene diisocyanate (HDI), pentamethylene diisocyanate, trimethylhexamethylene diisocyanate (TMHDI), lysine diisocyanate, and norbornane diisocyanate (NBDI).

Among these, preferable examples include a compound represented by Formula (C1-1) below, which is an isocyanurate of HDI, and a compound represented by Formula (C1-2) below, which is an isocyanurate of pentamethylene diisocyanate.

Moreover, among these, the isocyanurate compound (C1) is most preferably the compound represented by Formula (C1-2) below, because it is excellent in predetermined adhesion, is easily added to the composition due to its low viscosity, and has a low molecular weight, so that the content of the isocyanurate compound (C1) in the composition can be more effectively increased with a small amount of addition.

[Chemical Formula 3]

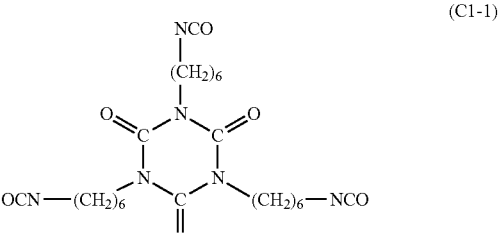

(C1-1)

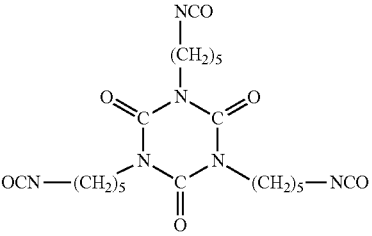

(C1-2)

((Meth)acrylate Compound (C2))

The (meth)acrylate compound (C2) is not particularly limited as long as it is a compound having an isocyanurate ring and a (meth)acryloyloxy group.

Specific examples of the (meth)acrylate compound (C2) include compounds obtained by reacting an aliphatic diisocyanate such as ethoxylated isocyanuric acid triacrylate, ε-caprolactone-modified tris(2-acryloxyethyl) isocyanurate; hexamethylene diisocyanate (HDI), pentamethylene diisocyanate, trimethylhexamethylene diisocyanate (TMHDI), lysine diisocyanate, or norbornane diisocyanate (NBDI) with a hydroxyl-containing acrylamide monomer such as hydroxyethyl acrylamide, or a hydroxyl-containing acrylate such as 4-hydroxybutyl acrylate.

Thiol Compound (C3)

The thiol compound (C3) is not particularly limited as long as it is a compound having an isocyanurate ring and a mercapto group.

Specific examples of the thiol compound (C3) include tris (ethyl-3-mercaptopropionate) isocyanurate and 1,3,5-tris (3-mercaptobutyryloxyethyl)-1,3,5-triazine-2,4,6 (1H,3H, 5H)-trion.

Glycidyl Compound (C4)

The glycidyl compound (C4) is not particularly limited as long as it is a compound having an isocyanurate ring and an epoxy group.

Specific examples of the glycidyl compound (C4) include 1,3,5-tris(2,3-epoxypropyl)-1,3,5-triazine-2,4,6(1H,3H, 5H)-trione.

The isocyanurate compound is preferably an isocyanurate compound (C1) of an aliphatic diisocyanate, and more preferably an isocyanurate of pentamethylene diisocyanate from the viewpoint of having excellent predetermined adhesion.

The isocyanurate compound is not particularly limited as to its production. Examples thereof include known ones. A commercially available product can be used as the isocyanurate compound.

The isocyanurate compound may be used alone or a combination of two or more types of the isocyanurate compounds may be used.

The content of the isocyanurate compound is preferably from 0.5 to 10 parts by mass, and more preferably from 1 to 5 parts by mass with reference to 100 parts by mass of the urethane prepolymer.

Terpene Compound Having Active Hydrogen

The terpene compound having active hydrogen (terpene compound) contained in the adhesive composition according to an embodiment of the present invention is a compound having active hydrogen and derived from a terpene.

The terpene compound having active hydrogen may have, for example, a hydroxy group as active hydrogen. The active hydrogen is preferably derived from a phenol compound from the viewpoint of being excellent in the predetermined adhesion.

Examples of the terpene compound having active hydrogen include modified monoterpenes such as monoterpenes having active hydrogens or hydrogenated monoterpenes having active hydrogen; and modified oligomers such as modified products of monoterpenes or oligomers of hydrogenated monoterpenes, or oligomers of modified monoterpenes.

Here, "terpene" refers to a series of compounds based on the isoprene rule, that is general term for compounds represented by the molecular formula $(C_5H_8)_n$. The n may be, for example, from 2 to 8.

"Monoterpene" refers to a compound represented by the molecular formula $(C_5H_8)_2$.

The oligomer can have from 2 to 6 repeating units derived from monoterpene or hydrogenated monoterpene. The oligomer may be a homopolymer (homooligomer) or a copolymer (co-oligomer).

•Monoterpene

Examples of the monoterpenes that can form the predetermined terpene compound include compounds represented by Formula (1) below (α-pinene), compounds represented by Formula (2) below (β-pinene), compounds represented by Formula (3) below (limonene), myrcene, carvone, and camphor. One of these may be used alone, or two or more types may be used in combination.

[Chemical Formula 4]

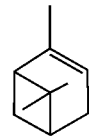

(1)

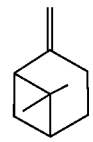

(2)

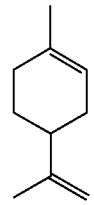

(3)

•Hydrogenated Monoterpene

The hydrogenated monoterpene that can form the predetermined terpene compound is a terpene compound obtained by hydrogenating the above-described monoterpene. The hydrogenation may be partial hydrogenation.

Examples of the hydrogenated monoterpene include a compound represented by Formula (4) below (p-menthane).

[Chemical Formula 5]

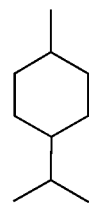

(4)

Modified Monoterpene

The modified monoterpene is a monoterpene obtained by modifying the monoterpene or the hydrogenated monoterpene with a hydroxyl group.

A preferred aspect of the modified monoterpene is a monoterpene obtained by modifying a monoterpene with a hydroxyl group.

Examples of the modified monoterpene include terpineols such as a compound represented by Formula (5) below (α-terpineol), a compound represented by Formula (6) below (β-terpineol), and a compound represented by Formula (7) below (γ-terpineol). These may be used alone or in combination of two or more.

[Chemical Formula 6]

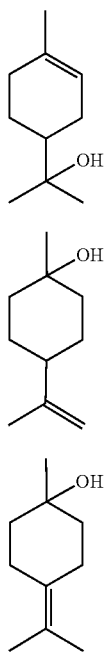

(5)

(6)

(7)

Modified Oligomer

The modified oligomer is preferably a phenol-modified product of an oligomer of a monoterpene or a hydrogenated monoterpene.

A preferred aspect of the modified oligomer is a compound having from 2 to 6 repeating units derived from the above-described monoterpene or modified monoterpene.

Examples of the modified oligomer include terpene phenol resins. Specific examples include a compound represented by Formula (8) below (terpene phenol resin).

[Chemical Formula 7]

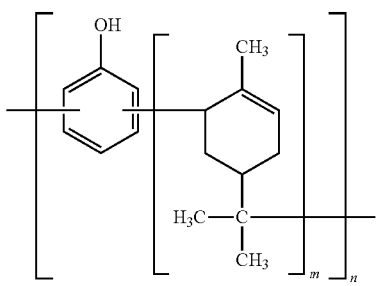

(8)

In Formula (8), m represents a number of 2 to 6, and n represents a number from 1 to 3.

The m is preferably from 2 to 5, and more preferably from 2 to 3.

The m×n is preferably from 2 to 5, and more preferably from 2 to 3.

Of the above-described terpene compounds, the modified oligomer is preferable, and the compound represented by Formula (8) above is more preferable because they have low odor and good workability.

The terpene compounds may be used alone or in combination of two or more thereof. The terpene compound is not particularly limited as to its production method. Examples thereof include known ones.

The content of the terpene compound is preferably from 0.1 to 10 parts by mass, and more preferably from 0.1 to 3 parts by mass with reference to 100 parts by mass of the urethane prepolymer.

Vinyl Silane Coupling Agent

The vinyl silane coupling agent contained in the adhesive composition according to an embodiment of the present invention is a compound represented by Formula (A).

[Chemical Formula 8]

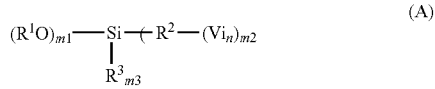

(A)

In Formula (A), $R^1$ and $R^3$ each independently represent a monovalent hydrocarbon group, $R^2$ represents a (n+1) valent hydrocarbon group, Vi represents —CH=CH$_2$, m1 is from 1 to 3, m2 is from 1 to 3, m3 is from 0 to 2, m1+m2+m3 is 4, and n is 1 or greater.

Note that in Formula (A), Vi may be directly bonded to a carbon atom constituting the $R^2$.

Monovalent Hydrocarbon Group

In Formula (A), examples of the monovalent hydrocarbon group constituting the R or $R^3$ include aliphatic hydrocarbon groups or aromatic hydrocarbon groups. The aliphatic hydrocarbon group may be at least one of linear, branched and cyclic.

Examples of the monovalent hydrocarbon group include a methyl group and an ethyl group.

(n+1) Valent Hydrocarbon Group

In Formula (A), $R^2$ is a linking group that links a silicon atom and a vinyl group.

Examples of the (n+1) valent hydrocarbon group constituting the $R^2$ include aliphatic hydrocarbon groups and aromatic hydrocarbon groups. Examples of the aliphatic hydrocarbon group include at least one of linear, branched, and cyclic.

The (n+1) valent hydrocarbon group is preferably an aliphatic hydrocarbon group, and more preferably a linear aliphatic hydrocarbon group, from the viewpoint of being excellent in the predetermined adhesion, and having excellent viscosity stability after storage and adhesion to the surface-treated base material under the above-described low wetting condition.

$R^2$ is preferably composed of only carbon and hydrogen atoms. In this case, in Formula (A), Vi is directly bonded to the carbon atom constituting the $R^2$.

The number of carbon atoms of the (n+1) valent hydrocarbon group is preferably from 3 to 12, more preferably from 4 to 10, and even more preferably from 6 to 8, from the viewpoint of being excellent in the predetermined adhesion, and having excellent viscosity stability after storage and adhesion to the surface-treated base material under the above-described low wetting condition.

Examples of the (n+1) valent hydrocarbon group include residues obtained by removing (n+1) hydrogen atoms from, for example, methane, ethane, propane, butane, pentane, hexane, heptane, octane, nonane, and decane.

Among these, the (n+1) valent hydrocarbon group is preferably a divalent hydrocarbon group such as a hexylene group and an octylene group (octalene group), from the viewpoint of being excellent in the predetermined adhesion, and having excellent viscosity stability after storage and adhesion to the surface-treated base material under the above-described low wetting condition.

(Vi)

In Formula (A), Vi represents a —CH=CH$_2$.

The Vi may be bonded to any of the carbon atoms constituting the R$^2$.

The Vi is preferably bonded to the terminal of the R$^2$, and more preferably bonded to the terminal carbon atom constituting R$^2$ (the terminal carbon atom opposite to the silicon atom), from the viewpoint of being excellent in the predetermined adhesion. In a case where the Vi is bonded to the terminal carbon atom of the R$^2$, the number of Vi bonded to the terminal carbon atom may be from 1 to 3.

(m1)

In Formula (A), m1 is from 1 to 3, and preferably from 2 to 3.

(m2)

In Formula (A), m2 is from 1 to 3, and preferably from 1 to 2.

(m3)

In Formula (A), m3 is from 0 to 2, and may be 0.

(n)

In Formula (A), n may be 1 or more, and preferably from 1 to 9.

In a preferred aspect of the vinyl silane coupling agent, m1 is 3, m2 is 1, m3 is 0, and n is 1 from the viewpoint of achieving excellent predetermined adhesion.

Examples of the vinyl silane coupling agent include alkenyl trialkoxy silanes such as 7-octenyl trimethoxy silane.

The vinyl silane coupling agent may be used alone or in combination of two or more thereof.

The vinyl silane coupling agent is not particularly limited as to its production method. Examples thereof include known methods.

Content of Vinyl Silane Coupling Agent

The content of the vinyl silane coupling agent is preferably from 5 to 0.01 part by mass, and more preferably from 0.5 to 0.05 part by mass with reference to 100 parts by mass of the urethane prepolymer, from the viewpoint of being excellent in the predetermined adhesion, and having excellent viscosity stability after storage and adhesion to the surface-treated base material under the above-described low wetting condition.

The adhesive composition according to an embodiment of the present invention may be of one-part or a two-part type.

Two-Part Type Adhesive Composition

In a case where the adhesive composition according to an embodiment of the present invention is of two-part type, the two-part type adhesive composition may include a main agent and a curing agent (a curing agent in a broad sense).

•Main Agent

In a preferred aspect, the main agent contains the urethane prepolymer, the isocyanurate compound, and the vinyl silane coupling agent.

Note that the terpene compound is contained in one or both of the main agent and the curing agent.

•Curing Agent

The curing agent (in the broad sense) may contain a compound having a plurality of active hydrogen-containing groups in one molecule (a curing agent in the narrow sense). The curing agent in the narrow sense means a compound which substantially reacts with the urethane prepolymer to cure the adhesive composition. The curing agent in the broad sense may include at least the curing agent in the narrow sense.

Examples of the curing agent in the narrow sense include the same ones as the active hydrogen compound that can be used in the production of the urethane prepolymer.

The curing agent in the narrow sense is preferably polyether polyol or a polybutadiene polyol.

The polyether polyol is the same as the polyether polyol described above.

Polybutadiene polyol is a polymer having two or more hydroxy groups, in which the main chain is a copolymer of polybutadiene or a copolymer of butadiene.

Examples of the main chain of the polybutadiene polyol include a butadiene homopolymer and a copolymer of butadiene and another monomer component. Examples of monomer components that can be copolymerized with butadiene include styrene and acrylonitrile. The above-described monomer components may be used alone or in combination of two or more.

The polybutadiene polyol may be hydrogenated.

The number of hydroxy groups in one molecule of the polybutadiene polyol may be two or more. Note that the number of hydroxy groups in one molecule of the polybutadiene polyol may be an average value.

In the polybutadiene polyol, the position where the hydroxy group is bonded is not particularly limited, but the hydroxy group is preferably bonded to the terminal.

In a preferred aspect, the polybutadiene polyol is liquid at room temperature.

Examples of the polybutadiene polyol include commercially available products such as R45HT and R15HT (both available from Idemitsu Kosan Co., Ltd.).

In the case of a two-part type, the urethane prepolymer may be used in such an amount that the amount of the isocyanate group is, for example, from 1.5 to 2.5 mol per 1 mol of the active hydrogen-containing group (for example, hydroxy group) of the curing agent in a narrow sense.

Other Optional Components

The adhesive composition according to an embodiment of the present invention may contain, as necessary, various additives, in a range that does not impair the object of the present invention, such as fillers (for example, carbon black and calcium carbonate), curing catalysts, plasticizers, anti-aging agents, antioxidants, silane coupling agents other than the above-described vinyl silane coupling agents, pigments (dyes), thixotropic agents, ultraviolet absorbers, flame retardants, surfactants (including leveling agents), dispersing agents, dehydrating agents, adhesion promoters, and antistatic agents.

Note that the filler may be surface-treated with, for example, at least one treatment agent selected from the group consisting of fatty acids, resin acids, urethane compounds, and fatty acid esters.

In addition, when the adhesive composition according to an embodiment of the present invention is a two-part type, it is possible to appropriately select whether the above-described optional component is added to the main agent or the curing agent.

•Carbon Black

The adhesive composition according to an embodiment of the present invention preferably further contains carbon black.

The carbon black is not particularly limited. Examples thereof include SAF (Super Abrasion Furnace), ISAF (Intermediate Super Abrasion Furnace), HAF (High Abrasion Furnace), FEF (Fast Extruding Furnace), GPF (General Purpose Furnace), SRF (Semi-Reinforcing Furnace), FT (Fine Thermal), and MT (Medium Thermal).

Specifically, examples of the SAR include SEAST 9 (available from Tokai Carbon Co., Ltd.), examples of the ISAF include Showa Black N 220 (available from Showa Cabot K.K.), examples of the HAF include SEAST 3 (available from Tokai Carbon Co., Ltd.), Niteron #200 (available from Shinnikka Carbon Co., Ltd.), and examples of the FEF include HTC #100 (available from Chubu Carbon K.K.). Furthermore, Asahi #55 (available from Asahi Carbon Co., Ltd.) and SEAST 5 (available from Tokai Carbon Co., Ltd.) as the GPF, Asahi #50 (available from Asahi Carbon Co., Ltd.) and Mitsubishi #5 (available from Mitsubishi Chemical Corporation) as the SRF, Asahi Thermal (available from Asahi Carbon Co., Ltd.) and HTC #20 (available from Chubu Carbon K.K.) as the FT, and Asahi #15 (available from Asahi Carbon Co., Ltd.) as the MT are exemplified.

The content of the carbon black is preferably from 30 to 70 parts by mass, and more preferably from 40 to 60 parts by mass, with reference to 100 parts by mass of the urethane prepolymer.

•Calcium Carbonate

The adhesive composition of the invention preferably further includes calcium carbonate.

The calcium carbonate is not particularly limited. Examples thereof include heavy calcium carbonate, precipitated calcium carbonate (light calcium carbonate), and colloidal calcium carbonate.

The content of the calcium carbonate is preferably from 20 to 150 parts by mass, and more preferably from 20 to 120 parts by mass, and even more preferably from 30 to 70 parts by mass with reference to 100 parts by mass of the urethane prepolymer.

Examples of the filler other than carbon black and calcium carbonate include various forms of organic or inorganic fillers. Specific examples thereof include silica such as fumed silica, calcined silica, precipitated silica, pulverized silica, and molten silica; diatomaceous earth; iron oxide, zinc oxide, titanium oxide, barium oxide, magnesium oxide; magnesium carbonate, zinc carbonate; pyrophyllite clay, kaolin clay, calcined clay; and fatty acid-treated products, resin acid-treated products, urethane compound-treated products, and fatty acid ester-treated products thereof.

•Curing Catalyst

The curing catalyst is not particularly limited, and specific examples thereof include carboxylic acids such as 2-ethylhexanoic acid and oleic acid; phosphoric acids such as polyphosphoric acid, ethyl acid phosphate and butyl acid phosphate; bismuth catalysts such as bismuth octylate; tin catalysts such as dibutyltin dilaurate and dioctyltin dilaurate; and tertiary amine catalysts such as 1,4-diazabicyclo[2.2.2]octane, 2,4,6-tris(dimethylaminomethyl)phenol (for example, DMP-30), and compounds containing a dimorpholino diethyl ether structure.

The curing catalyst preferably contains a dimorpholino diethyl ether structure from the viewpoint of being excellent in the predetermined adhesion.

The dimorpholino diethyl ether structure is a structure having a dimorpholinodiethyl ether as a basic structure.

In the dimorpholino diethyl ether structure, the hydrogen atom contained in the morpholine ring may be substituted with a substituent. The substituent is not particularly limited. Examples thereof include alkyl groups. Examples of the alkyl group include a methyl group and an ethyl group.

Examples of the amine catalyst having the dimorpholino diethyl ether structure include compounds represented by Formula (9) below.

[Chemical Formula 9]

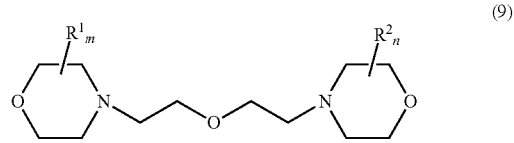

In Formula (9) above, $R^1$ and $R^2$ are each independently an alkyl group, and m and n are each independently 0, 1, or 2.

Specific examples of the amine catalyst having a dimorpholino diethyl ether structure include dimorpholinodiethyl ether (DMDEE), di(methylmorpholino)diethyl ether, and di(dimethylmorpholino)diethyl ether.

A single curing catalyst can be used or a combination of two or more curing catalysts can be used.

The content of the curing catalyst is preferably from 0.05 to 2.0 parts by mass, and more preferably from 0.1 to 0.5 parts by mass with reference to 100 parts by mass of the urethane prepolymer.

•Plasticizer

Specific examples of the plasticizer include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; propylene glycol adipate polyester, and butylene glycol adipate polyester. One type of these may be used alone, or two or more types of these may be used in combination.

The content of the plasticizer is preferably from 1 to 50 parts by mass, and more preferably from 5 to 40 parts by mass with reference to 100 parts by mass of the urethane prepolymer.

Production Method

In a case where the adhesive composition according to an embodiment of the present invention is a one-part type, the production method thereof is not particularly limited. For example, it can be produced by a method of mixing a urethane prepolymer, the isocyanurate compound, the terpene compound, the vinyl silane coupling agent, and other optional components that may be used as necessary.

In a case where the adhesive composition according to an embodiment of the present invention is of a two-part type, the production method is not particularly limited. For example, it can be produced by a method in which the main agent and the curing agent are respectively put in separate containers, and the contents in each container are mixed in a nitrogen gas atmosphere.

Furthermore, as a method of using the two-part type, the main agent and the curing agent may be mixed and used.

Base Material

Examples of the base material to which the adhesive composition according to an embodiment of the present invention can be applied include plastics, glass, rubbers, and metals.

The base material is preferably a base material containing an olefin resin.

The base material containing an olefin resin may be a base material obtained from a mixture of the olefin resin and a filler such as carbon fiber, glass such as glass filler, talc, calcium carbonate, or alumina.

The plastic may be a homopolymer, a copolymer, or a hydrogenated product. The same applies to rubber.

Specific examples of the plastic include olefin resins such as polypropylene, polyethylene, ethylene propylene copolymers, COP (cycloolefin polymer), and COC (cycloolefin copolymer);

polyester resins such as polyethylene terephthalate (PET) and polybutylene terephthalate (PBT);

polymethyl methacrylate resins (PMMA resins); polycarbonate resins; polystyrene resins; acrylonitrile-styrene copolymer resins; polyvinyl chloride resins; acetate resins; ABS resins (acrylonitrile butadiene styrene resins); and polyamide resins.

The "COC" means cycloolefin copolymers such as copolymers of tetracyclododecene and olefin such as ethylene.

Furthermore, the "COP" means cycloolefin polymers such as polymers obtained by, for example, subjecting norbornenes to ring-opening polymerization and hydrogenation.

The plastic may be a poorly adhesive resin.

The base material may have undergone a surface treatment. Examples of the surface treatment include flame treatment, corona treatment, and ITRO treatment. The method of the surface treatment is not particularly limited. Examples thereof include some known methods.

The method of applying the adhesive composition according to an embodiment of the present invention to the base material is not particularly limited. Examples thereof include some known methods.

In a case where the adhesive composition according to an embodiment of the present invention is used, predetermined adhesion can be exhibited at an excellent level without using a primer to the base material.

The adhesive composition according to an embodiment of the present invention can be cured by, for example, moisture. For example, the adhesive composition according to an embodiment of the present invention can be cured in the condition of 5 to 90° C. at a relative humidity (RH) from 5 to 95%.

Note that the adhesive composition according to an embodiment of the present invention can be cured by water such as moisture as described above, without irradiating the adhesive composition according to an embodiment of the present invention with light such as ultraviolet rays.

Use

Examples of the use of the adhesive composition according to an embodiment of the present invention include direct glazing adhesives, sealants for automobiles, and sealants for building components.

EXAMPLE

The present invention is described below in detail using examples but the present invention is not limited to such examples.

Production of Two-Part Adhesive Composition

•Original Two-Part Adhesive Composition

The main agents and the curing agents were each produced by mixing the components in Table 1 below according to the compositions shown in Table 1 (shown as part by mass) using mixers.

Thereafter, 100 g of the main agent produced as described above and the curing agent produced as described above were mixed at a mass ratio of main agent/curing agent shown in Table 1 to obtain a two-part adhesive composition.

•Two-Part Adhesive Composition After Storage

After the main agent and the curing agent prepared as described above were placed under conditions of 40° C. and 80% relative humidity for six months, the main agent after storage and the curing agent after storage were mixed at the mass ratio shown in the column of main agent/curing agent in Table 1, thus obtaining a two-part adhesive composition after storage.

Production of One-Part Adhesive Composition

•Original One-Part Adhesive Composition

The original one-part adhesive composition was obtained by mixing the components in Table 2 below according to the compositions shown in the same table (shown as part by mass) using a mixer.

•One-Part Adhesive Composition After Storage

Each of the original one-part adhesive compositions prepared as described above was placed under the conditions of 40° C. and 80% relative humidity for six months to obtain a one-part adhesive composition after storage.

For the adhesive compositions produced as described above, adhesion was evaluated for each evaluation item by the methods described below. The results are shown in each Table. Note that the "heat-resistant adhesion after storage to resin" was evaluated by a tensile test result using a test sample after heat aging test, which was produced from the one- or two-part adhesive composition after storage.

Preparation of Test Samples

Two pieces of adherends formed by subjecting one face of a substrate (width: 25 mm, length: 120 mm, thickness: 3 mm) formed from a polypropylene resin (trade name: Nobrene, available from Sumitomo Chemical Co., Ltd.) to a flame treatment were prepared.

After the adherends were flame-treated, it was confirmed that the wettability on the surface of the resin was 45.0 mN/m or greater, using the Wetting Tension Test Mixture (available from Wako Pure Chemical Industries, Ltd.).

Subsequently, the two-part adhesive composition in the original or after storage, or the one-part adhesive composition in the original or after storage was applied to a surface of one adherend (the face on which the flame treatment was performed) in a manner that the width was 25 mm, the length was 10 mm, and the thickness was 5 mm. Thereafter, the coated surface was adhered to a surface of another adherend (the face on which the flame treatment was performed) and compression-bonded to produce an original test sample under conditions of 23° C. and 50% RH for 3 days.

Aging Test of Test Samples

The original test sample produced as described above was subjected to the following aging tests.

•Water Immersion Aging Test

The original test sample was subjected to a water immersion aging test in which the original test sample was immersed in warm water at 60° C. for 3 days to obtain a test sample after water immersion aging.

•Heat Aging Test

The original test sample was subjected to a heat aging test under 80° C. for 10 days to obtain a test sample after heat aging.

Evaluation

Tensile Test

For each of the original test sample the test sample after water immersion aging, and the test sample after heat aging produced as described above, tensile test (tensile test speed of 50 mm/min at 20° C.) was performed in accordance with JIS K 6850:1999 to measure the shear strength (MPa), and the failure state was confirmed by visual observation. The results are shown in the tables below.

•Evaluation Criteria for Failure State

For the test samples after the tensile test, failure state was visually observed, and the case where the cohesive failure was observed in the adhesive was evaluated as "CF", and the case where the interfacial failure was observed between the adherend and the adhesive was evaluated as "AF". The numerical values written after "CF" or "AF" represent approximate areas (%) occupied by the failure states on the adhering surface.

In the present invention, in the evaluation result of the failure state of the tensile test using the test sample after the heat aging test, which was produced with the one- or two-part adhesive composition after storage, when the area occupied by CF is 80% or more, the sample is regarded to be excellent in the predetermined adhesion.

The same applies to evaluation items other than those described above.

•Shear Strength Evaluation Criteria

In the present invention, the shear strength is preferably 1.3 MPa or greater.

Note that in a case where the evaluation results of the failure state are the equivalent for the predetermined adhesion, the one having higher shear strength is regarded as excellent in predetermined adhesion.

The same applies to evaluation items other than those described above.

TABLE 1

(two-part adhesive composition)

| | | | Comparative Example 1-1 | Comparative Example 1-2 | Comparative Example 1-3 | Comparative Example 1-4 | Example 1-1 | Example 1-2 | Example 1-3 | Comparative Example 1-5 | Comparative Example 1-6 |
|---|---|---|---|---|---|---|---|---|---|---|---|
| Main agent | Urethane prepolymer | | 42.4 | 42.4 | 42.4 | 42.4 | 42.4 | 42.4 | 42.4 | 42.4 | 42.4 |
| | Isocyanurate compound 1 | PDI nurate | | 1.7 | 1.7 | 1.7 | 1.7 | 1.7 | 1.7 | 1.7 | 1.7 |
| | Terpene compound 1 | YS RESIN CP | | 0.3 | 0.3 | 0.3 | 0.3 | 0.3 | 0.3 | 0.3 | 0.3 |
| | Vinyl silane coupling agent 1 | Long chain alkyl vinyl silane | | | | | 0.05 | 0.01 | 1 | | |
| | Comparative silane coupling agent | Vinyl silane | | | 0.05 | | | | | | |
| | Comparative epoxy silane coupling agent | Long chain alkyl epoxy silane | | | | 0.05 | | | | | |
| | Comparative monosulfide silane | | | | | | | | | 0.05 | |
| | Comparative (meth)acryl silane coupling agent | | | | | | | | | | 0.05 |
| | Carbon black | 200MP | 20.6 | 20.6 | 20.6 | 20.6 | 20.6 | 20.6 | 20.6 | 20.6 | 20.6 |
| | Calcium carbonate 1 | Super S | 19.3 | 19.3 | 19.3 | 19.3 | 19.3 | 19.3 | 19.3 | 19.3 | 19.3 |
| | Plasticizer | DINP | 15.5 | 15.5 | 15.5 | 15.5 | 15.5 | 15.5 | 15.5 | 15.5 | 15.5 |
| | Curing catalyst 1 | DMDEE | 0.15 | 0.15 | 0.15 | 0.15 | 0.15 | 0.15 | 0.15 | 0.15 | 0.15 |
| | Total | | 97.95 | 99.95 | 100 | 100 | 100.0 | 100.0 | 101.0 | 100 | 100 |
| Curing agent | Polyol compound 1 | PPG1000 (F = 3) | 45.9 | 45.9 | 45.9 | 45.9 | 45.9 | 45.9 | 45.9 | 45.9 | 45.9 |
| | Polyol compound 2 | R-45HT | 5.0 | 5.0 | 5.0 | 5.0 | 5.0 | 5.0 | 5.0 | 5.0 | 5.0 |
| | Terpene compound 2 | Terpineol | 2 | 2 | 2 | 2 | 2 | 2 | 2 | 2 | 2 |
| | Calcium carbonate 2 | KALFAIN 200 | 46.8 | 46.8 | 46.8 | 46.8 | 46.8 | 46.8 | 46.8 | 46.8 | 46.8 |
| | Curing catalyst 2 | DMDEE | 0.3 | 0.3 | 0.3 | 0.3 | 0.3 | 0.3 | 0.3 | 0.3 | 0.3 |
| | Total | | 100.0 | 100.0 | 100.0 | 100.0 | 100.0 | 100.0 | 100.0 | 100.0 | 100.0 |
| Main agent/curing agent (mass ratio) | | | 10/1 | 10/1 | 10/1 | 10/1 | 10/1 | 10/1 | 10/1 | 10/1 | 10/1 |
| Original two-part adhesive composition | Tensile test result | Original test sample | Failure state | AF100 | CF100 | CF100 | CF100 | CF100 | CF100 | CF100 | CF100 | CF100 |
| | | | Shear strength [MPa] | 0.41 | 3.24 | 3.06 | 3.15 | 3.86 | 3.66 | 1.84 | 3.80 | 2.03 |
| | | Test sample after water immersion aging test | Failure state | AF100 | AF100 | AF100 | AF100 | CF100 | CF90 AF10 | CF100 | CF100 | AF100 |
| | | | Shear strength [MPa] | 0.33 | 0.38 | 0.48 | 0.40 | 3.27 | 3.03 | 1.43 | 3.08 | 0.44 |

TABLE 1-continued (two-part adhesive composition)

|  |  |  |  | Comparative Example 1-1 | Comparative Example 1-2 | Comparative Example 1-3 | Comparative Example 1-4 | Example 1-1 | Example 1-2 | Example 1-3 | Comparative Example 1-5 | Comparative Example 1-6 |
|---|---|---|---|---|---|---|---|---|---|---|---|---|
|  |  | Test sample after heat aging test | Failure state | AF100 | AF100 | AF100 | AF100 | CF100 | CF90 AF10 | CF100 | CF100 | AF100 |
|  |  |  | Shear strength [MPa] | 0.35 | 0.47 | 0.51 | 0.38 | 3.95 | 2.96 | 1.99 | 3.55 | 0.37 |
| Two-part adhesive composition after storage (40° C., 80% RH, 6 months) | Tensile test result | Original test sample | Failure state | AF100 | CF100 | CF70 AF30 | CF40 AF60 | CF100 | CF95 AF5 | CF100 | CF100 | AF100 |
|  |  |  | Shear strength [MPa] | 0.29 | 3.11 | 2.73 | 2.36 | 3.69 | 2.75 | 1.55 | 3.51 | 0.29 |
|  |  | Test sample after water immersion aging test | Failure state | AF100 | AF100 | AF100 | AF100 | CF100 | CF95 AF5 | CF90 AF10 | CF95 AF5 | AF100 |
|  |  |  | Shear strength [MPa] | 0.30 | 0.25 | 0.31 | 0.47 | 3.08 | 2.43 | 1.49 | 3.46 | 0.32 |
|  |  | Test sample after heat aging test | Failure state | AF100 | AF100 | AF100 | AF100 | CF100 | CF90 AF10 | CF90 AF10 | AF100 | AF100 |
|  |  |  | Shear strength [MPa] | 0.35 | 0.33 | 0.37 | 0.62 | 3.77 | 2.85 | 1.72 | 2.41 | 0.36 |

TABLE 2

(one-part adhesive composition)

|  |  | Comparative Example 2-1 | Comparative Example 2-2 | Comparative Example 2-3 | Comparative Example 2-4 | Example 2-1 | Example 2-2 | Example 2-3 | Comparative Example 2-5 | Comparative Example 2-6 |
|---|---|---|---|---|---|---|---|---|---|---|
| Urethane prepolymer |  | 42.4 | 42.4 | 42.4 | 42.4 | 42.4 | 42.4 | 42.4 | 42.4 | 42.4 |
| Isocyanurate compound 1 | PDI nurate |  | 1.7 | 1.7 | 1.7 | 1.7 | 1.7 | 1.7 | 1.7 | 1.7 |
| Terpene compound 1 | YS RESIN CP |  | 0.3 | 0.3 | 0.3 | 0.3 | 0.3 | 0.3 | 0.3 | 0.3 |
| Vinyl silane coupling agent 1 | Long chain alkyl vinyl silane |  |  |  |  | 0.05 | 0.01 | 1 |  |  |
| Comparative silane coupling agent | Vinyl silane |  |  |  | 0.05 |  |  |  |  |  |
| Comparative epoxy silane coupling agent | Long chain alkyl epoxy silane |  |  |  | 0.05 |  |  |  |  |  |
| Comparative monosulfide silane |  |  |  |  |  |  |  |  | 0.05 |  |
| Comparative (meth)acryl silane coupling agent |  |  |  |  |  |  |  |  |  | 0.05 |
| Carbon black | 200MP | 20.6 | 20.6 | 20.6 | 20.6 | 20.6 | 20.6 | 20.6 | 20.6 | 20.6 |
| Calcium carbonate 1 | Super S | 19.3 | 19.3 | 19.3 | 19.3 | 19.3 | 19.3 | 19.3 | 19.3 | 19.3 |
| Plasticizer | DINP | 15.5 | 15.5 | 15.5 | 15.5 | 15.5 | 15.5 | 15.5 | 15.5 | 15.5 |
| Curing catalyst 1 | DMDEE | 0.15 | 0.15 | 0.15 | 0.15 | 0.15 | 0.15 | 0.15 | 0.15 | 0.15 |
| Total |  | 97.95 | 99.95 | 100 | 100 | 100.0 | 100.0 | 101.0 | 100 | 100 |

| Original one-part adhesive composition | Tensile test result | Original test sample | Failure state | AF100 | CF100 | CF100 | CF100 | CF100 | CF100 | CF100 | CF100 | CF100 |
|---|---|---|---|---|---|---|---|---|---|---|---|---|
|  |  |  | Shear strength [MPa] | 0.38 | 3.51 | 3.44 | 3.63 | 4.24 | 3.79 | 2.04 | 4.10 | 3.36 |
|  |  | Test sample after water immersion aging test | Failure state | AF100 | CF20 AF80 | CF50 AF50 | AF100 | CF100 | CF90 AF10 | CF100 | CF100 | AF100 |
|  |  |  | Shear strength [MPa] | 0.35 | 0.41 | 0.78 | 0.42 | 3.81 | 3.44 | 1.67 | 3.75 | 0.53 |
|  |  | Test sample after heat aging test | Failure state | AF100 | CF30 AF70 | CF30 AF70 | CF20 AF80 | CF100 | CF95 AF5 | CF100 | CF100 | AF100 |
|  |  |  | Shear strength [MPa] | 0.29 | 0.55 | 0.69 | 0.35 | 4.11 | 3.27 | 1.96 | 3.94 | 0.31 |

TABLE 2-continued (one-part adhesive composition)

|  |  |  |  | Comparative Example 2-1 | Comparative Example 2-2 | Comparative Example 2-3 | Comparative Example 2-4 | Example 2-1 | Example 2-2 | Example 2-3 | Comparative Example 2-5 | Comparative Example 2-6 |
|---|---|---|---|---|---|---|---|---|---|---|---|---|
| One-part adhesive composition after storage (40° C., 80% RH, 6 months) | Tensile test result | Original test sample | Failure state | AF100 | CF100 | CF100 | CF70 AF30 | CF100 | CF95 AF5 | CF100 | CF100 | AF100 |
|  |  |  | Shear strength [MPa] | 0.32 | 3.36 | 2.95 | 3.24 | 4.05 | 3.26 | 1.83 | 3.72 | 0.48 |
|  |  | Test sample after water immersion aging test | Failure state | AF100 | CF25 AF75 | CF40 AF60 | AF100 | CF100 | CF90 AF10 | CF90 AF10 | CF95 AF5 | AF100 |
|  |  |  | Shear strength [MPa] | 0.46 | 0.59 | 0.44 | 0.38 | 3.78 | 3.19 | 1.46 | 3.59 | 0.62 |
|  |  | Test sample after heat aging test | Failure state | AF100 | CF30 AF70 | CF20 AF80 | AF100 | CF100 | CF90 AF10 | CF95 AF5 | AF100 | AF100 |
|  |  |  | Shear strength [MPa] | 0.31 | 0.44 | 0.57 | 0.33 | 3.85 | 3.20 | 1.52 | 2.88 | 0.55 |

The details of each component shown in each table are as follows.

Main Agents in Table 1 and Components in Table 2

• Urethane prepolymer: urethane prepolymer produced by mixing 70 parts by mass of polyoxypropylene diol (trade name: SANNIX PP2000, available from Sanyo Chemical Industries, Ltd.; weight average molecular weight: 2,000), polyoxypropylene triol (trade name: SANNIX GP3000, available from Sanyo Chemical Industries, Ltd.; weight average molecular weight: 3,000), and MDI (trade name: Sumidur 44S, available from Sumika Bayer Urethane Co., Ltd.) in a manner that NCO/OH (molar ratio) was 2.0, and reacting the mixture in a condition at 80° C. for 5 hours.

• Isocyanurate compound 1: isocyanurate of pentamethylene diisocyanate represented by Formula (C1-2) below (available from Mitsui Chemicals, Inc.)

[Chemical Formula 10]

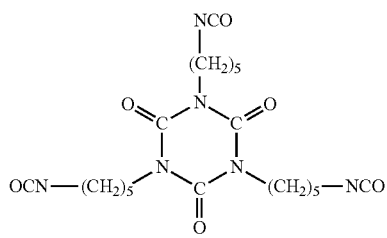

(C1-2)

• Terpene compound 1: a terpene compound having a hydroxy group derived from a phenol compound as active hydrogen. YS RESIN CP (available from Yasuhara Chemical Co., Ltd.)

• Vinylsilane coupling agent 1: 7-octenyltrimethoxysilane (structure shown below), KBM-1083, available from Shin-Etsu Chemical Co., Ltd.

[Chemical Formula 11]

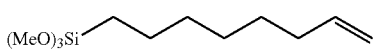

• Comparative silane coupling agent: vinyltrimethoxysilane (structure shown below), KBM-1003, available from Shin-Etsu Chemical Co., Ltd.

[Chemical Formula 12]

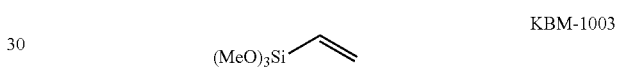

KBM-1003

• Comparative epoxy silane coupling agent: glycidoxyoctyltrimethoxysilane (structure shown below), KBM-4803, available from Shin-Etsu Chemical Co., Ltd.

[Chemical Formula 13]

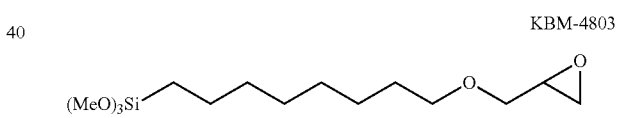

KBM-4803

• Comparative monosulfide silane: compound represented by Formula (2) below.

[Chemical Formula 14]

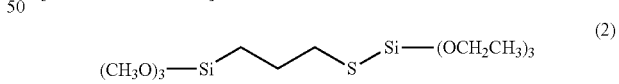

(2)

• Comparative (meth)acryl silane coupling agent: methacryloxyoctyltrimethoxysilane (structure shown below), KBM-5803 available from Shin-Etsu Chemical Co., Ltd.

[Chemical Formula 15]

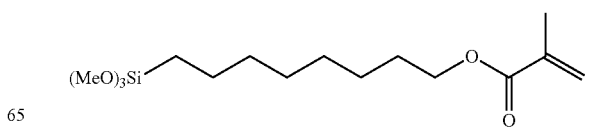

•Carbon black: trade name: Niteron #200, available from Shinnikka Carbon Co. Ltd., HAF grade carbon black

•Calcium carbonate 1: heavy calcium carbonate, trade name: Super S, available from Maruo Calcium Co., Ltd.

•Plasticizer: diisononyl phthalate, available from J-Plus Co., Ltd.

•Curing catalyst 1: dimorpholino diethyl ether, trade name: UCAT-660M, available from San-Apro Ltd.

Curing Agent in Table 1

•Polyol compound 1: polyoxypropylene triol, weight average molecular weight: 1,000, trade name: EXCENOL 1030, available from Asahi Glass Co., Ltd. Applicable to curing agents in the narrow sense.

•Polyol compound 2: liquid polybutadiene diol having hydroxyl group at the terminal ("Poly bd R-45HT", available from Idemitsu Kosan Co., Ltd.) Applicable to a curing agent in the narrow sense. Liquid at room temperature. Having about 2 hydroxy groups in one molecule.

•Terpene compound 2: terpineol (available from Yasuhara Chemical Co., Ltd.)

•Calcium carbonate 2: calcium carbonate surface treated with fatty acid, KALFAIN 200, available from Maruo Calcium Co., Ltd.

•Curing catalyst 2 DMDEE: dimorpholinodiethyl ether, trade name: UCAT-660M, available from San-Apro Ltd.

As is clear from the results shown in Table 1 (two-part adhesive composition), Comparative Example 1-1, which did not contain a predetermined isocyanurate compound and a vinyl silane coupling agent, exhibited poor failure state (AF100%) in the tensile test using the test sample after heat aging test prepared from a two-part adhesive composition after storage, and was inferior in the predetermined adhesion.

Comparative Example 1-2, which did not contain the predetermined vinyl silane coupling agent, was inferior in the predetermined adhesion, similarly to Comparative Example 1-1.

Comparative Example 1-3 to 6, which did not contain the predetermined vinyl silane coupling agent, but instead contained a comparative silane coupling agent (vinyltrimethoxysilane), a comparative epoxy silane coupling agent, comparative monosulfide silane or comparative (meth)acryl silane coupling agent, were inferior in the predetermined adhesion, similarly to Comparative Example 1-1.

On the other hand, the adhesive composition according to an embodiment of the present invention had excellent heat-resistant adhesion after storage to resin.

As is clear from the results shown in Table 2 (one-part adhesive composition), Comparative Example 2-1, which did not contain a predetermined isocyanurate compound, a terpene compound, and a vinyl silane coupling agent, exhibited poor failure state (AF100%) in the tensile test using the test sample after heat aging test prepared from a one-part adhesive composition after storage, and was inferior in the predetermined adhesion.

Comparative Example 2-2, which did not contain the predetermine vinyl silane coupling agent, was inferior in the predetermined adhesion similarly to Comparative Example 2-1.

Comparative Example 2-3 to 6, which did not contain the predetermined vinyl silane coupling agent, but instead contained a comparative silane coupling agent (vinyltrimethoxysilane), a comparative epoxy silane coupling agent, comparative monosulfide silane or comparative (meth)acryl silane coupling agent, were inferior in the predetermined adhesion, similarly to Comparative Example 2-1.

On the other hand, the adhesive composition according to an embodiment of the present invention had excellent heat-resistant adhesion after storage to resin.

The invention claimed is:

1. A urethane adhesive composition comprising:
a urethane prepolymer having an isocyanate group;
an isocyanurate compound having an isocyanurate ring;
a terpene compound having active hydrogen; and
a vinyl silane coupling agent represented by Formula (A) below:

[Chemical Formula 1]

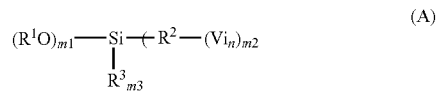

where in Formula (A), $R^1$ and $R^3$ each independently represent a monovalent hydrocarbon group, $R^2$ represents a (n+1) valent hydrocarbon group, Vi represents —CH=CH$_2$, m1 is from 1 to 3, m2 is from 1 to 3, m3 is from 0 to 2, m1+m2+m3 is 4, and n is 1 or greater.

2. The urethane adhesive composition according to claim 1, wherein a content of the vinyl silane coupling agent is from 5 to 0.01 parts by mass with reference to 100 parts by mass of the urethane prepolymer.

3. The urethane adhesive composition according to claim 2, wherein in Formula (A), the (n+1) valent hydrocarbon group is a linear aliphatic hydrocarbon group.

4. The urethane adhesive composition according to claim 2, wherein in Formula (A), a number of carbons of the (n+1) valent hydrocarbon group is from 3 to 12.

5. The urethane adhesive composition according to claim 2, wherein in Formula (A), at least one Vi binds to a terminal of $R^2$.

6. The urethane adhesive composition according to claim 2, wherein in Formula (A), m1 is 3, m2 is 1, m3 is 0, and n is 1.

7. The urethane adhesive composition according to claim 2, wherein the isocyanurate compound is an isocyanurate compound of an aliphatic diisocyanate.

8. The urethane adhesive composition according to claim 2, wherein the isocyanurate compound is an isocyanurate of pentamethylene diisocyanate.

9. The urethane adhesive composition according to claim 2, wherein the active hydrogen is derived from a phenol compound.

10. The urethane adhesive composition according to claim 2, wherein the terpene compound is a phenol-modified product of an oligomer of a monoterpene or a hydrogenated monoterpene, or a modified monoterpene.

11. The urethane adhesive composition according to claim 1, wherein in Formula (A), the (n+1) valent hydrocarbon group is a linear aliphatic hydrocarbon group.

12. The urethane adhesive composition according to claim 1, wherein in Formula (A), a number of carbons of the (n+1) valent hydrocarbon group is from 3 to 12.

13. The urethane adhesive composition according to claim 1, wherein in Formula (A), at least one Vi binds to a terminal of $R^2$.

14. The urethane adhesive composition according to claim 1, wherein in Formula (A), m1 is 3, m2 is 1, m3 is 0, and n is 1.

15. The urethane adhesive composition according to claim 1, wherein the isocyanurate compound is an isocyanurate compound of an aliphatic diisocyanate.

16. The urethane adhesive composition according to claim 1, wherein the isocyanurate compound is an isocyanurate of pentamethylene diisocyanate.

17. The urethane adhesive composition according to claim 1, wherein the active hydrogen is derived from a phenol compound.

18. The urethane adhesive composition according to claim 1, wherein the terpene compound is a phenol-modified product of an oligomer of a monoterpene or a hydrogenated monoterpene, or a modified monoterpene.

19. The urethane adhesive composition according to claim 1, wherein the urethane adhesive composition is two-part and has a main agent and a curing agent,
- wherein the main agent contains the urethane prepolymer, the isocyanurate compound, and the vinyl silane coupling agent;
- the curing agent contains a compound having a plurality of active hydrogen-containing groups in one molecule; and
- the main agent and/or the curing agent contain(s) the terpene compound.

20. An adhered article comprising the urethane adhesive composition according to claim 1, and an olefin resin-based substrate.

* * * * *